Oct. 27, 1936.   H. I. BECKER   2,058,946
ELECTRICAL COMPRESSION OR TENSION GAUGE
Filed July 30, 1931

Inventor:
Howard I. Becker,
by Charles E. Tuller.
His Attorney.

Patented Oct. 27, 1936

2,058,946

UNITED STATES PATENT OFFICE 2,058,946

ELECTRICAL COMPRESSION OR TENSION GAUGE

Howard I. Becker, Schenectady, N. Y., assignor to General Electric Company, a corporation of New York Application July 30, 1931, Serial No. 554,047

7 Claims. (Cl. 177—351)

My invention relates to means for measuring mechanical force by electrical methods, and relates in particular to electric compression or tension gauges.

Among the objects of my invention is to provide a device which will give a remote indication of the force measured and which can be calibrated to indicate the forces directly, and to provide a device which may be arranged to form an integral part of structures in which the forces are to be measured in order that the rigidity of the structure may be retained.

In accordance with my invention I provide a quadrangular sheet of conducting material having the center portion removed so that the remaining portion forms the arms of a Wheatstone bridge. One pair of opposite terminals of the Wheatstone bridge is connected to a source of current and the other pair of opposite corners is connected to a current responsive device. One of the arms of the Wheatstone bridge so formed is subjected to the force to be measured so as to deform during the application of the force a portion of the material of which it is formed thereby changing its dimensions and consequently its electrical resistance. The device may be arranged so that the force to be measured causes either a compressive or tensile strain in the arm of the Wheatstone bridge and the force may be applied either longitudinally or transversely. The bridge is balanced so that normally no current flows in the current responsive device by removing sufficient material from one or more of the arms of the bridge to cause the resistance of the arms to have the same ratios in each branch of the circuit. When the force is applied the resistance of one of the arms changes so that the bridge is unbalanced and the reading obtained from the instrument gives the measure of the magnitude of the force applied.

The features of my invention which I believe to be novel and patentable will be pointed out in the claims appended hereto.

Figure 1:
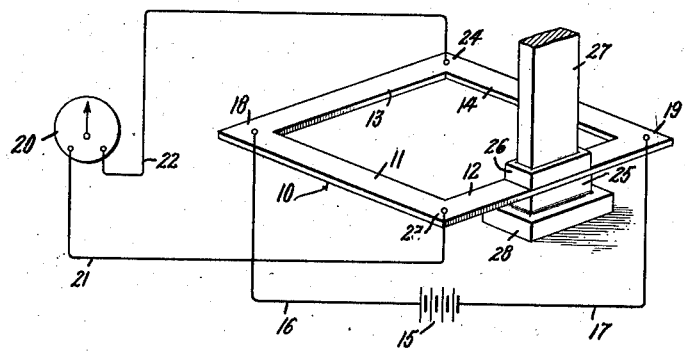
Figure 2:
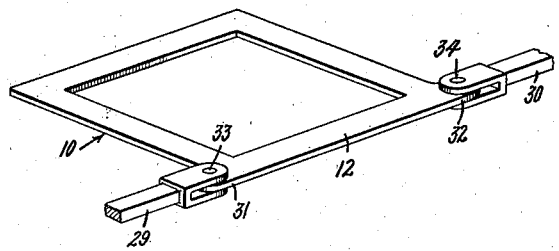

For a better understanding of my invention reference may be had to the accompanying drawing in which Fig. 1 represents diagrammatically an embodiment of my invention in which the force to be measured is applied transversely to one arm of the bridge, and Fig. 2 represents one modification in which the bridge is arranged so that the force may be applied longitudinally to one of the arms.

Referring to Fig. 1 in accordance with this modification of my invention I provide a sheet of conducting material 10, preferably metal, from which the inner portion has been removed so as to leave strips 11, 12, 13, and 14 forming the arms of a Wheatstone bridge. The figure resulting from the removal of the inner portion of the sheet I have referred to hereinafter as a hollow square. It will be understood however that I am not limited to the use of an equilateral rectangular bridge unit 10, as the bridge 10 may take the form of any four-sided figure with the center portion cut away to leave four current-conducting portions, each joined at the ends to the ends of adjacent current-conducting portions, and I have used the term "hollow square" to signify any such figure. It will be understood that the bridge might also be formed in other ways as by joining separate strips of material. Although I prefer to form the four arms of my bridge as one integral unit for the sake of greater sturdiness, strength and durability, it will be understood that the bridge may also be formed of independent units suitably connected electrically. A battery 15 is connected by means of leads 16 and 17 to the corners 18 and 19 of the bridge. A galvanometer 20 is connected by means of leads 21 and 22 to the corners 23 and 24 of the bridge. The bridge may be balanced by properly adjusting the resistance of the arms by cutting away material or by other means which will suggest themselves to those skilled in the art. The arm 12 is placed between two insulating members 25 and 26 and a compressive force is transmitted to the portion of the arm 12 lying between members 25 and 26 by the member 27 which bears against the insulating piece 26. Its force is resisted by the block 28 which represents any suitable support for the device. The force applied to the member 27 will tend to compress the arm 12 so as to diminish its cross section and increase its length, thereby changing its electrical resistance. The change in resistance will alter the ratio of resistance of the arms 11, 12, 13, and 14 of the bridge, and consequently cause a current to flow in the instrument 20. The degree of unbalance will depend upon the magnitude of the force and consequently the instrument 20 may be calibrated to indicate directly the magnitude of this force. It will be understood that the hollow square or bridge 10 is so designed that the deformation or strain produced by the maximum force to be measured will not exceed the elastic limit of the material. Consequently, after the force is removed the material will return to its original dimensions, and a subsequent application of a given force will produce the same change in dimensions and resistance during the application of the force. A substantially constant calibration is thereby obtained. In using the term "deformed" I refer to changes in dimension within the elastic limit.

I have shown an arrangement for measuring directly compressive forces in a member such as member 27. However, it will be understood that tensile stresses or torques may also be measured by transmitting the forces to the member 27 by means of suitable arrangement of links or levers.

It is apparent that in the arrangement disclosed in Fig. 1 the member 27 may be fixed as rigidly with respect to either lateral or longitudinal motion as if it rested directly upon the support 28. My device is therefore of advantage in measuring forces in structural members, the rigidity of which may not be interfered with while measurements are being taken.

It will also be understood that my device may be arranged so that the arm 12 of the bridge 10 with the insulating members 25 and 26 is placed between any two members bearing toward one another, the compressive stresses in which are to be measured since in this case it is not necessary to utilize knife edges or pivoted supports. Since the indicating device 20 may be placed wherever convenient, although at a distance from bridge 10, my device facilitates measuring forces in members hitherto inaccessible.

The arm 12 of the Wheatstone bridge may be deformed in any manner which will change its electrical resistance in accordance with the force applied. For example, I may also arrange the bridge 10 as shown in Fig. 2 in which tension members 29 and 30 are connected to the ends 31 and 32 of the arm 12 so that the arm 12 may be made a portion of a tension member in any suitable structure. In this case the force applied elongates the member 12 and also decreases its cross section so as to increase its electrical resistance and unbalance the bridge circuit in the same manner as explained in connection with Fig. 1.

It will be understood that the bridge 10 will be suitably insulated from the structure of which it is built by use of insulating pins 33 and 34, by inserting insulating portions in the tension members 29 and 30 or by any other suitable means well known in the art.

It will also be understood that I may arrange my device to cause deformations in more than one of the arms of the bridge 10.

Although I have shown current responsive device 20 of the indicating type my invention obviously also includes current responsive devices of the contact-making or other types.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other arrangements.

What I claim as new and desire to secure by Letters Patent of the United States, is:

1. In a force measuring appliance, an integral current conducting member having four portions in a closed series circuit forming the four arms of a Wheatstone bridge, means for producing a compressive strain in one of said portions so as to cause a variation in its electrical resistance dependent upon the magnitude of a force applied thereto, and means responsive to said variation in electrical resistance.

2. A measuring appliance comprising a current-conducting unit providing a pair of parallel current paths normally balanced in resistance, one of said parallel current paths including an elastically extensible and compressible relatively rigid current-conducting member which may be subjected to a mechanical force so as to be deformed, thereby causing a variation in its electrical resistance, and means responsive to the unbalance caused by the variation in resistance of said member so as to provide a measure of the deforming force.

3. In a force measuring appliance, an integral member comprising a continuous electrical conductor having four portions forming the four arms of a Wheatstone bridge, means for subjecting one of said portions to a mechanical force in accordance with variations in the magnitude of the forces to be measured, thereby deforming said portion and causing a relative variation in resistance of the arms of said Wheatstone bridge, and means responsive to the relative variations in resistance of said portion to provide a measure of the force applied.

4. In a measuring appliance, a current conducting member formed in the shape of a hollow square from a single piece of metal, one side of said square being subjected to a mechanical force so as to be deformed thereby, and means responsive to the relative variation in resistance of said deformed side with respect to the undeformed sides, said means serving to provide a measure of the deforming force.

5. In a measuring appliance, an elastically extensible and compressible relatively rigid current conducting member subjected to a mechanical force so as to be deformed thereby, causing a variation in its electrical resistance, and means responsive to the variation in resistance of said member, so as to provide a measure of the deforming force.

6. In a force measuring appliance, a Wheatstone bridge comprising four arms of relatively stiff material joined to form a rigid unit, and means for causing one of said arms to be deformed in accordance with variations in the magnitude of the force to be measured thereby varying its resistance and means responsive to said variations in resistance to provide a measure of the force applied.

7. In a force measuring appliance, an integral current conducting member having four portions in a closed series circuit forming the arms of a Wheatstone bridge, means for producing a tensile strain in one of said portions so as to cause a variation in its electrical resistance dependent upon the magnitudue of a force applied thereto, and means responsive to said variation in electrical resistance.

HOWARD I. BECKER.